United States Patent Office 3,052,677
Patented Sept. 4, 1962

3,052,677
METALLO-AZINE PIGMENTS
William E. Erner, Wilmington, Del., assignor to Air Products and Chemicals, Inc., a corporation of Delaware
No Drawing. Filed Jan. 8, 1960, Ser. No. 1,176
16 Claims. (Cl. 260—242)

The present invention relates to new metallo-organic complexes formed from N-heterocyclic compounds and to methods of preparing the same. It is particularly concerned with those metallo-organic complexes formed from heterocyclic compounds having a 6-membered ring containing at least one N atom in the ring, which complexes are relatively stable water insoluble bright colored pigments. Such colored pigments are formed by reacting a suitable heterocyclic nitrogen compound with a copper compound containing or forming cuprous ion and with halide or cyanide ions, under conditions such that the obtained complex contains a cuprous ion for each halide ion or CN ion.

The insoluble halide pigments of the present invention are characterized by having at least one mol of CuX for each mol of heterocyclic nitrogen compound, the more important and preferred compounds being linear complexes wherein several such heterocyclic nitrogen compounds are coupled by copper linkages formed at the hetero nitrogen. Some of the linear complexes, as hereinafter explained, may have additional coupling at a carbon atom of the ring through a copper bridge. In all of said complexes the ratio of copper to halide ion is 1/1. These complexes provide bright colored pigments which are distinguished from the quaternary double salts of certain heterocyclic nitrogen bases which can be formed by reacting a quaternary hydrohalide or alkohalide with cuprous halide, which double salts have a Cu/halide ratio of 1/2. These quaternary double salts, in contrast to the bright colored pigments of the invention, have appreciable water solubility, poor stability and are generally of dull color.

The insoluble bright colored metallo complexes are formed in accordance with the invention by reacting a heterocyclic nitrogen base of the type hereinafter described, with a copper compound containing or forming cuprous ions and with halide (or cyanide) ions.

The initial reaction may be carried out directly with a cuprous salt in a suitable solvent, or with cupric salt in the presence of a reducing agent capable of reducing the cupric ion to monovalent state under the reaction conditions employed in the formation of the metallo-heterocyclic complex.

Among the types of heterocyclic nitrogen compounds undergoing the described complex halide formation, there are included monocyclic structures having two or more hetero nitrogens in a 6-membered ring, as well as certain polycyclic structures containing a single hetero N atom in a 6-membered ring, which polycyclic structure is of sufficiently high molecular weight and/or complexity, as will hereinafter appear. Such N hetero compounds are herein referred to generically as azines; those having 2 hetero N atoms in a 6-member ring being designated as diazines.

In a typical reaction illustrating the invention, pyrazine is reacted with cupric chloride in the presence of a reducing agent, such as hydrazine hydrate. The reactions are believed to take place in accordance with the mechanism shown below:

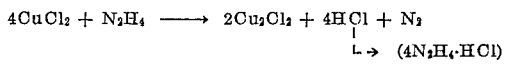

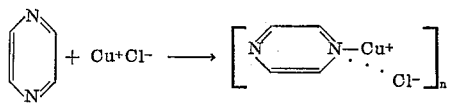

The complex formed with 2,3-dimethyl pyrazine and cupric chloride in the presence of hydrazine, in accordance with the above, is blood red. Similar complexes are obtained when using metallic copper, iron, or ferrous compounds as reducing agents.

The halide ion may be introduced by starting with a halide of copper or it may be provided from an external source. Thus, if the reaction illustrated above is carried out using cuprous acetate, the desired pigment can be caused to precipitate out on further addition of HCl. Among the halides, chlorides generally give the brightest colors with the alkyl pyrazines; the bromides are browner; the fluorides as a rule are more water soluble and do not precipitate. The iodides are usually yellower and show greater or less fluorescence in the reddish spectrum, however, in some cases the iodides give brilliant red pigments.

The indicated reaction goes quite readily to substantial completion and the appearance of the color is observed even in high dilution. Thus, in the reaction of 2-ethyl pyrazine with cuprous chloride the red coloration was evident at a pyrazine concentration of 50 p.p.m.

The indicated reaction takes place not only with pyrazine but with any organic pyrazino structure which is not sterically hindered, including polycyclic ocmpounds such as

Quinoxaline and

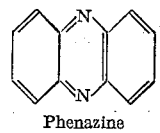

Phenazine

When using silver intsead of copper as the metallic component, there are obtained only white pigments which are photo-sensitive. Since the silver halides generally are insoluble, this reason is best effected using silver nitrate or other soluble silver compound as reactant together with a soluble halide such as calcium chloride. Thus, when pyrazine is reacted with silver nitrate, calcium chloride can be added to precipitate the silver pyrazinium halide complex.

The colored water-insoluble copper pyrazinium complexes formed in accordance with the invention are readily and quantitatively wetted by benzene and other aromatic solvents forming suspensions which can be easily separated, filtered and dried to obtain oil dispersible pigments for inks, paints, marking solutions, etc.

Since the cuprous halides are not readily soluble in water, it is necessary when using these mono-valent copper salts directly as reactants to employ a solubilizing agent therefor. Thus, the reaction can be carried out, for example, by stirring together an aqueous pyrazine solution with cuprous chloride dissolved in a suitable water miscible solvent such as dimethyl formamide. Moderate warming facilitates this solution.

*Example I*

(a) In a preliminary experiment which led to the present invention, while making a survey study of Werner complexes of amines, aqueous cupric chloride was added to 2,5-dimethyl pyrazine and the mixture stirred with a steel-bladed spatula. It was noted that the blade was covered with a strongly adhering blood-red percipitate. It was suspected and later confirmed that the colored precipitate was a pyrazine complex.

(b) In further study of this reaction of the 2,5-dimethyl pyrazine and cupric chloride, there was added to the mixed solution (in the absence of metallic iron) a solution of ferrous sulfate. A blood red pigment was precipitated.

(c) To determine whether the colored pigment obtained contained iron, copper, or both, the experiment was repeated using hydrazine hydrate as a reducing agent in the cupric chloride-dimethyl pyrazine system. This reagent was found to be extremely effective in obtaining the blood red precipitate, which formed quickly with evolution of nitrogen gas from oxidative decomposition of the hydrazine. It was accordingly established that iron was not a necessary component of the precipitate.

(d) Cupric sulfate substituted for chloride gave no precipitate, even when chloride was subsequently added. However, a cupric acetate-dimethyl pyrazine solution was quickly reduced to a deep orange solution by addition of hydrazine hydrate. Subsequent dropwise addition of hydrochloric acid obtained the blood-red precipitate in very pure color and form. The importance of halide in the colored pigments was thus established and subsequently confirmed.

*Example II*

The procedure of Example I(c) above was repeated using hydrazine hydrate on the cupric chloride mixtures with unsubstituted pyrazine and with other substituted pyrazines. These reactions were carried out by dissolving 1 molal equivalent of the pyrazine compound in about 100 parts of water and adding to this solution a solution composed of one-half molal equivalent of hydrazine hydrate and 1 molal equivalent cupric chloride in 100 parts water. Immediate reaction took place with the formation of the colored pigment and liberation of nitrogen.

(a) As applied to the 2,5-dimethyl pyrazine as starting compound the relative weights of reactants were:

|  | Molal Equiv. | Pts. by wt. |
| --- | --- | --- |
| 2,5-dimethyl pyrazine | 1 | 108 |
| hydrazine hydrate | ½ | 25 |
| cupric chloride | 1 | 135 |

The obtained bright red cuprous pyrazinium chloride precipitate was filtered from the liquid, washed with dilute aqueous hydrazine solution and dried in an atmosphere of nitrogen. In the case of 2,5-dimethyl pyrazine, 200 parts by weight of dry pigment were recovered corresponding to 97% by weight of the theoretical mono-cuprous salt.

Good recoveries were also obtained by the same procedure with the other pyrazine starting compounds. The particular color of the insoluble comple formed was found to be a function of the specific pyrazine used. The colors obtained with cupric chloride and hydrazine were as follows:

(b) Pyrazine, brick red.
(c) 2-methylpyrazine, mandarin red.
(d) 2-ethyl pyrazine, mandarin red.
(e) 2-methyl-3-ethyl-pyrazine, orange.
(f) Trimethyl pyrazine, cadmium yellow.
(g) Tetra methyl pyrazine, cadmium yellow.
(h) Tetra phenyl pyrazine (in acetic acid), yellow.
(i) Repetition of several of the above experiments on 2,5-dimethyl pyrazine with copper bromide and copper iodide respectively, produced insoluble pigments in the bright yellow range. The corresponding fluoride complex or salt of 2,5-dimethyl pyrazine was quite water soluble and did not precipitate.

The chloride precipitation of the copper heterocyclic complex is nearly quantitative. In the case of the pyrazines, taking dimethyl pyrazine as typical, the ratio of reactants indicates that the obtained cuprous complexes are linear, corresponding to the probable formula

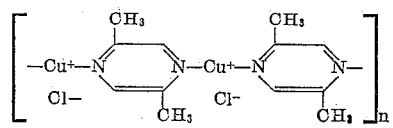

$Cu^+/N$ cpd.=2/2, and containing approximately one cuprous ion for each pyrazine molecule (i.e. for every two hetero nitrogen atoms). These may be designated "mono-salts."

*Example III*

In a preparation of the pigment type compounds of Example II it was found that the precipitated red cuprous salt, while still suspended in the aqueous-hydrazine mother liquor or aqueous wash waters was readily flushed over into a suspension in an oily organic solvent. Thus the red cuprous 2,5-dimethyl pyrazinium chloride suspension of Example II was contacted with an equal volume of benzene in three successive shakings. In the first contact essentially all of the red cuprous pigment was preferentially picked up by the organic solvent to make a solvent-wetted (and oil wettable) slurry which was separated. The second solvent portion removed a small residual fraction of red solid, while the third portion remained white and the aqueous solution contacted was essentially clear and just off white. The second solvent portion was added to the first red slurry and filtered. The recovered solid red product was readily dried, ground and sealed. The solid pigment so obtained was readily reslurried in oil or organic solvents and a portion ground with a white (5% titanium dioxide) methacrylate base varnish in the ratio of 15% of red pigment to 85 parts of oil based varnish made a pink-red coating composition which resisted color change due to oxidation, reduction, or thermal dissociation when applied as a film on metal distillation column jackets heated to and maintained at temperatures of the order of 100° F. to 150° F.

*Example IV*

(a) One molal equivalent (108 parts) of 2,5-dimethyl pyrazine was reacted with 100 parts of cuprous chloride, each component being dissolved in 4–6 times its weight of dimethyl formamide. Mild heating and stirring were employed to facilitate solution of the cuprous chloride. By admixture of the two solutions reaction occurred with the precipitation of the blood red (vermilion) pigment—cuprous 2,5-dimethyl pyrazinium chloride—which was recovered by filtration.

(b) By the same procedure there was formed the corresponding yellow cuprous complex of tetraphenyl pyrazine. Addition of acetic acid as in Example II(h), was not required.

(c) Starting with 2,3-dimethyl quinoxaline by the same procedure employing dimethyl formamide as mutual solvent, there was obtained the corresponding red cuprous pigment. Unsubstituted quinoxaline by the same procedure gave a red pigment, and with unsubstituted pyrazine the typical brick red pigment was obtained.

(d) A 10% solution of 2,3,6-trimethyl quinoxaline in acetonitrole was reacted with stirring in of ⅔ equivalents of cuprous iodide. A bright orange-red precipitate was obtained, which was separated by filtration, washed and dried. The obtained pigment showed orange-red fluorescence.

(e) In the same manner as above described, reaction of cuprous iodide with styryl quinaldine in acetonitrile solution produced a non-fluorescent bright yellow pigment.

The styryl quinaldine was obtained by reacting quinaldine (2-methyl quinoline) with benzaldehyde in acetic anhydride and distilling off the acid. The obtained styryl quinaldine corresponds to the formula—

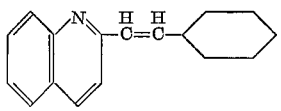

(f) By adding a saturated solution of cuprous iodide in acetonitrile dropwise to ⅔ equivalent of acridine in acetonitrile, there was obtained a startlingly brilliant orange-red pigment, which was collected by filtration, washed and dried.

Other mutual solvents for the cuprous halide salt and the heterocyclic nitrogen compound can be employed instead of dimethyl formamide or acetonitrile, including: dimethylacetamide, propionitrile, benzonitrile and similar acid amides and nitriles (excluding acrylonitrile and unsaturated acid amides and nitriles).

Example V

A solution of cuprous pyridinium chloride was obtained by dissolving 200 parts pyridine in 100 parts of dimethyl formamide and adding thereto a solution of 108 parts cuprous chloride in 1200 parts dimethyl formamide. On standing and cooling there separated from the liquid, yellow needle-like crystals of the cuprous pyridinium salt. These yellow Lewis salts of comparatively low molecular weight and high solubility have little value as pigments. They have been conveniently employed, however, to react with more complex or higher molecular weight heterocyclic nitrogen compounds to precipitate less soluble and more highly colored complexes useful as pigments. By analysis the pyridinium compound is a "semi-salt" with $Cu^+/N$ cpd. in a 1/2 ratio.

Example VI (a) The warmed cuprous pyridinium chloride solution in dimethyl formamide (free from crystals) obtained in the previous example, was added to 180 parts of acridine (2-3, 5-6-dibenzpyridine) dissolved in 180 parts of dimethyl formamide (slightly in excess of 3 mols of the pyridinium compound to 2 mols of acridine). Reaction took place rapidly with the precipitation of a cuprous acridinium chloride complex as a bright yellow solid. The obtained pigment showed good color stability when heated overnight at 90–100° F. In the case of acridine the complex formed contained 3 cuprous ions for every two mols of nitrogen compound, corresponding to a sesqui salt:

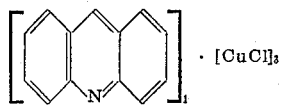

By the same procedure of reacting 3 mols of cuprous pyridinium chloride solution with (b) 2 mols 3-methyl isoquinoline and (c) 2 mols of quinaldine (in acetonitrile), yellow insoluble precipitates were formed in each case, corresponding to mono salts.

(d) The same procedure using the cuprous pyridinium chloride solution as reactant gives with pyrazine the typical brick red pigment and with (e) 9-methyl acridine gives a bright orange pigment.

The corresponding insoluble cuprous iodide complexes of these starting azine compounds are obtained by employing cuprous pyridinium iodide as the reactant.

Other cuprous halide complexes were prepared by the methods hereinbefore described using either (A) precipitation by the pyridinium cuprous halide reagent or (B) reaction with cuprous halide in dimethyl formamide (or acetonitrile) solution. The colors of the cuprous chloride complexes obtained in typical reactions are indicated below:

| | Method | Color |
|---|---|---|
| Sesqui salts: | | |
| 1,2,3,4-tetrahydrophenazine | B | red. |
| 2-methyl-3 n.amyl-quinoxaline | A | Do. |
| 2,3,6-trimethyl quinoxaline (in CH₃CN) | B | Do. |
| 2,3 - dimethyl - 6 - chloro - quinoxaline (in CH₃CN). | B | Do. |
| phenazine (in CH₃CN) | B | black. |
| styryl quinaldine (in CH₃CN) | B | yellow. |
| Mono salts: | | |
| phenanthridine | A, B | Do. |
| 2,3,5,7-tetramethyl quinoxaline | A, B | Do. |
| 2,3,6,7-tetramethyl quinoxaline | A, B | Do. |
| 9-methyl phenanthridine | A, B | pale yellow. |
| 2-methyl-3-isopropyl quinoxaline | A, B | yellow. |
| 2,3 - dimethyl - 6 - nitro - quinoxaline (in CH₃CN). | B | black. |

From the experimental work carried out on numerous heterocyclic nitrogen compounds its was observed that the heat of reaction of the cuprous salt therewith increased in direct proportion to the stability of the cuprous halide complex formed. It was further found that both the heat of reaction and the stability of the obtained cuprous halide complex increased with increase in molecular weight and/or complexity of the starting heterocyclic nitrogen compound. Thus, increased stability and reactivity is in the order semi-salts<mono salts<sesqui salts. Within each grouping the individual cuprous halide complexes show differences in degree of solubility and other physical properties.

From the ratio of the reactants used in forming the copper halide complexes it appears that three distinct types of quaternary N salts can be formed depending upon the nature of the heterocyclic nitrogen compound reacted. Thus, pyridine forms a semi-salt containing one atom of copper for each two atoms of nitrogen. Pyrazine and its mono- and di-alkyl derivatives, quinoline, phenanthridine, etc. form mono-salts having two coppers atoms for 2 mols of the nitrogen compound; apparently the linear chain may contain carbonium as well as ammonium-copper linkages. In the case of the acridine, quinoxaline, and their simple substitution derivatives (e.g. alkyl, alkenyl, etc.), as well as in the case of styryl quinaldine, sesqui salts are formed having 3 atoms of copper for 2 mols of nitrogen compound. The sesqui salts are believed to correspond to ammonium-carbonium complexes, which, as exemplified in the case of 2,3-dimethyl quinoxaline, can be formulated empirically as

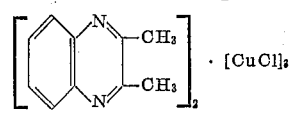

Without being bound thereto, the arrangement pattern in the case of the quinoxalines can be visualized as having the quinoxaline molecules lying in planes parallel to the paper, with the CuCl in rows of alternating Cu and Cl atoms at right angles to these planes. Each Cu bridge is attached to two molecules of the diazine compound either through their hetero N atoms or through carbonium linkages on the carbocyclic rings.

The semi-salts are fairly soluble and have little or no value as pigments. The mono-salts formed with quinoline and with quinolines having only simple substituents such as short chain alkyl groups produce only pale yellowish complexes or salts of low stability. As the molecular weight and complexity of the substituent attached to the hetero ring of the quinoline adjacent the N is increased without introduction of steric hindrance, the stability of the formed complex is improved. Thus, with styryl quinaldine valuable bright colored pigments are obtained in the form of the sesqui salts, probably due in part to the activity and resonance of the extra cyclic —C=C— bond. These and other sesqui salts described and those complexes containing even a higher ratio of copper to nitrogen compound are the most stable and most valuable among the various colored pigments formed. The preferred pigments, accordingly, include those formed with dialkyl quinoxalines, acridines, phenazine and tetraazanaphthacenes.

When the empirical composition of the cuprous pigment is known or the Cu/N compound ratio determined by a trial experiment, the reaction is effected by using a slight excess of the copper reagent above stoichiometric requirements, whether cuprous halide in a mutual solvent is used or the cuprous pyridinium halide. By first testing a higher ratio of cuprous reagent, the required stoichiometric ratios can be determined.

The bright red cuprous halide pigments obtained with alkyl pyrazines are transformed to yellow on heating to above 150° C. but return to red on cooling (in presence of excess pyrazine compound). This property suggests use of these compounds in temperature indicators.

Certain of the cuprous halide complexes of individual heterocyclic nitrogen compounds have shown unusual and interestering properties. For instance, the metallocomplex which is readily formed from cuprous iodide and 2,3-dimethyl quinoxaline in acetonitrile solution (generally by the procedure of Example IV), is a bright red solid which fluoresces a bright flame red in ultra violet light. Panels painted with a composition containing 10% of the cuprous 2,3-dimethyl quinoxalinium iodide pigment and 5% titanium dioxide in an alkyd base also fluoresced bright red in ultra violet light.

By reacting with cuprous pyridinium chloride as described in Example VI, there was formed a cuprous chloride complex of 2-methyl-3-isopropyl quinoxaline, which pigment had a brilliant orange fluorescence in crystalline form. The complex was insoluble in hexane but very soluble in ethanol, acetone, and acetonitrile; which solutions showed no fluorescence. While the lower homologous 2,3-dimethyl quinoxaline formed a sesqui type salt, it appears that the presence of the bulkier isopropyl group adjacent one of the hetero nitrogen atoms hinders the coupling of further cuprous chloride, and only a mono cuprous salt was obtained.

*Example VII*

(a) 5 parts of 2,3-dimethyl-1,4,6,11-tetraza-naphthacene dissolved in 50 parts of acetonitrile were admixed with 5 parts of cuprous chloride dissolved in 100 parts acetonitrile. A black precipitate was readily formed, which was separated by filtration and sucked dry. This compound, by analysis, appears to be a "penta salt," $Cu_5$ $(N\ cmpd.)_2\ Cl_5$.

(b) By reacting the same starting tetrazanaphthacene compound as in (a) above with cuprous iodide under the same conditions, the corresponding cuprous iodide complex was obtained as a black colored pigment. The corresponding bromide was likewise obtained as a black pigment when cuprous bromide was substituted as the metallizing reagent.

(c) The tetrazanaphthacene compound used above was prepared as follows: 170 parts of o-phenylene diamine hydrochloride were oxidized with an excess solution of ferric chloride containing sodium acetate. The mixed phenazines, which formed as a precipitate, were collected, and by-product (acidic) 2-hydroxy-3-amino-phenazine removed by solution in caustic and water washing. The 2,3-diamino phenazine remaining in the precipitate was dissolved in 400 parts of 15% acetic acid solution and the obtained solution treated with 50 parts diacetyl monoxime. Unreacted diamino-phenazine was removed from the 2,3-dimethyl naphthacene thus formed by boiling with dilute acetic acid to hydrolyze an amino group therein and dissolving the 2-hydro-3-amino phenazine thus formed, in warm caustic solution.

There has thus far been observed and identified four classes of cuprous heterocyclic N-halide complexes namely:

| | $Cu^+/N$-compound |
|---|---|
| Semi-salts, e.g. pyridine | 1/2 |
| Mono-salts, e.g. pyrazine | 2/2 |
| Sesqui salts, e.g. acridine | 3/2 |
| Penta-salt, 2,3-dimethyl-1,4,6,11-tetrazanaphthacene | 5/2 |

These and probably other classes of cuprous hetero-organic salts are feasible within the perview of the invention. The hetero ring or any aromatic carbocyclic ring that may be fused therewith may contain hydrocarbon substituents, such as alkyl, aryl, or alkenyl (e.g. styryl) or non-functional substituents (e.g. halide, nitro). Branched chain aliphatic substituents having the branch at the alpha carbon attached to the ring at a position adjacent (ortho) to the hetero nitrogen at times presents steric hindrance which interferes with cuprous coupling of that nitrogen. While compounds having aliphatic substituents of up to 6 carbon atoms are presently preferred, there may be instances in which it is desired to employ starting azine compounds having longer chain hydrocarbon substituents to improve oil solubility of the cuprous halide pigment derived therefrom.

The described cuprous complexes of the azines are formed not only with halide ion but analogous complexes are obtained with cuprous cyanide. Since the cyanide ion behaves in many instances similarly to halide it may be designated a "pseudo-halide." Thus, by reacting 2 mols of 2,3-dimethyl tetraza 1,4,6,11-naphthacene with 5 mols cuprous cyanide in acetonitrile solution a black pigment was obtained, corresponding to the empirical formula $Cu_5$—$(TAN)_2$—$(CN)_5$. Two mols of acridine dissolved in acetonitrile were reacted with cuprous cyanide solution (in acetonitrile) providing slightly in excess of 3 mols CuCN, to form a precipitate of cuprous acridinium cyanide as a lemon yellow pigment.

Obviously many modifications and variations of the invention as hereinbefore set forth may be made without departing from the spirit and scope thereof, and therefore only such limitations should be imposed as are indicated in the appended claims.

What is claimed is:

1. Water-insoluble cuprous halide complexes of diazines containing Cu and halogen atoms in 1/1 ratio, said complexes containing at least 2 mols of the diazine coupled by a cuprous bridge linking the same at a hetero N atom of the diazine, such diazine being selected from the group consisting of:

(a) quinoxaline and mono to tetra substituted quinoxalines wherein the substituents thereon are selected from the group consisting of lower alkyl, chloro and nitro;

(b) phenazine and tetrahydrophenazine;

(c) pyrazine, tetraphenyl pyrazine and mono to tetra lower alkyl pyrazines.

2. The water-insoluble cuprous chloride complex of 2,3-dimethyl quinoxaline.

3. Water-insoluble cuprous halide complexes of acridines selected from the group consisting of acridine and lower alkyl acridines, said complexes having Cu and azine structures in the ratio of 3/2 and Cu/halogen in 1/1 ratio.

4. Water-insoluble cuprous halide complexes of styryl quinaldine, said complexes having Cu and azine structures in the ratio of 3/2 and Cu/halogen in 1/1 ratio.

5. The method of preparing water-insoluble cuprous halide complexes of diazines which comprises reacting such diazine with a cuprous pyridinum halide in a mutual solvent.

6. The method of preparing water-insoluble cuprous halide complexes of acridines which comprises reacting 2 mols of an acridine compound with approximately 3 mols of cuprous pyridinium halide in a mutual solvent.

7. The method of preparing stable brightly colored pigment which comprises reacting 2 mols of styryl quinaldine with approximately 3 mols of cuprous pyridinium halide in a mutual solvent.

8. The method of forming insoluble colored pigments which comprises reacting pyrazine with cupric chloride in equimolar quantity and in the presence of hydrazine.

9. The method of forming insoluble colored pigments which comprises reacting 2 mols of a quinoxaline with approximately 3 mols of cuprous halide in a mutual solvent.

10. The method according to claim 9 wherein dimethyl formamide is employed as the mutual solvent.

11. The method according to claim 9 wherein acetonitrile is employed as mutual solvent.

12. The method of forming insoluble colored pigments which comprises reacting 2 mols of a tetrazanaphthacene with approximately 5 mols of cuprous halide in acetonitrile solution.

13. The method of forming insoluble colored pigments which comprises reacting 2 mols of a tetrazanaphthacene with approximately 5 mols of cuprous cyanide in a mutual solvent.

14. The water-insoluble cuprous iodide complex of 2,3-dimethyl quinoxaline.

15. The water-insoluble cuprous chloride complex of C—C dimethyl pyrazine.

16. The water-insoluble cuprous iodide complex of C-methyl acridine.

References Cited in the file of this patent

UNITED STATES PATENTS

| | | |
|---|---|---|
| 1,227,624 | Hussey et al. | May 29, 1917 |
| 2,014,519 | Block | Sept. 17, 1935 |
| 2,200,689 | Eckert et al. | May 14, 1940 |
| 2,512,689 | Smith | June 27, 1950 |
| 2,767,187 | Shrader et al. | Oct. 16, 1956 |
| 2,854,458 | Reppe et al. | Sept. 30, 1958 |

UNITED STATES PATENT OFFICE
CERTIFICATE OF CORRECTION

Patent No. 3,052,677                                        September 4, 1962

William E. Erner

It is hereby certified that error appears in the above numbered patent requiring correction and that the said Letters Patent should read as corrected below.

Column 2, line 52, for "reason" read -- reaction --; column 3, line 74, for "comple" read -- complex --; column 5, line 5, for "acetonitrole" read -- acetonitrile --.

Signed and sealed this 16th day of July 1963.

(SEAL)
Attest:

ERNEST W. SWIDER                                     DAVID L. LADD
Attesting Officer                                         Commissioner of Patents